J. W. BURT.
PLOW LINE HOLDER.
APPLICATION FILED JULY 17, 1918.
1,297,086.
Patented Mar. 11, 1919.
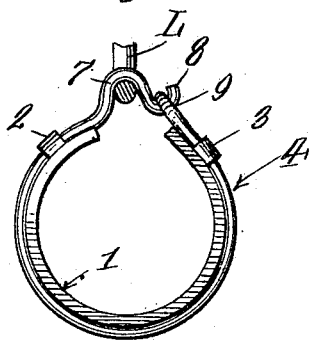
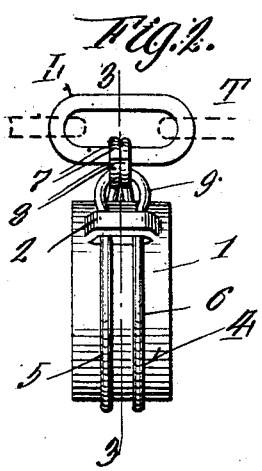
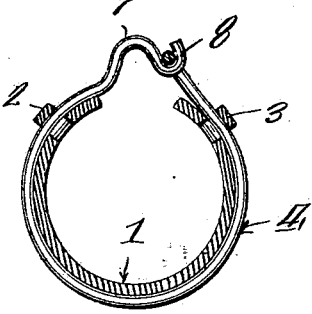
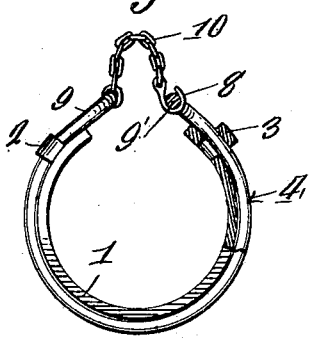
Witnesses
Guy M. Spring
S. M. McColl
Inventor
John W. Burt
By Richard B. Owen
Attorney

UNITED STATES PATENT OFFICE.

JOHN W. BURT, OF CASCILLA, MISSISSIPPI.

PLOW-LINE HOLDER.

1,297,086.   Specification of Letters Patent.   Patented Mar. 11, 1919.

Application filed July 17, 1918.   Serial No. 245,394.

*To all whom it may concern:*

Be it known that I, JOHN W. BURT, a citizen of the United States, residing at Cascilla, in the county of Tallahatchie and State of Mississippi, have invented certain new and useful Improvements in Plow-Line Holders, of which the following is a specification.

This invention relates to plow line supports or holders.

The object of the invention is to provide a simple and efficient device of this character for use on single plow harness which will properly support the lines without wearing them.

Another object is to so construct a device of this character, the line contact surface of which is composed of leather suitably reinforced to withstand the strains to which the holder will be subjected.

Another object is to provide improved means for connecting the support to a trace or other part of the harness.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents an end elevation of a holder constructed in accordance with this invention shown applied to a chain trace, the link of which is in section, Fig. 2 is a side elevation thereof shown applied, Fig. 3 is a vertical section taken on the line 3—3 of Fig. 2, and Fig. 4 is an end elevation partly in section showing a slightly different form of the invention.

In the embodiment illustrated, a split leather loop 1 is shown which may be of any suitable or desired width, about one-half an inch, more or less, and which is slit transversely near its opposite ends to provide loops 2 and 3. These loops 2 and 3 are formed by arranging transversely extending, parallel longitudinally spaced slits in the loop 1. This loop 1 is made of heavy leather so that the contact face for the lines, which are usually made of cotton rope will not wear or impair them, and consequently the life of the lines used in connection with this support is greatly prolonged.

The loops or bands 1 are reinforced by annular split metal members 4 which are here shown composed of a piece of heavy wire bent intermediately of its ends to form parallel members 5 and 6 spaced slightly apart and the free ends of which are bowed outwardly as shown at 7, and their terminals bent to form hooks 8 which are designed to interlockingly engage for connecting the holder to a chain trace T, said device being here shown connected with a link L of said trace in Figs. 1 and 2.

In the use of this holder, the outwardly bowed portion 7 is designed to form a seat for engagement with the link L as is shown clearly in Fig. 1 to prevent movement of the holder in said link which depends therefrom to receive the line, not shown. After the lateral loop or bowed portion 7 has been engaged with the link, the hook 8 is interlockingly engaged with the folded or bent end 9 of the reinforcing wire 4 whereby all possibility of the holder becoming accidentally detached from its supports is avoided.

In Fig. 4 a slightly different form of connecting means for the holder is shown, a chain 10 being shown engaged with the bent end 9 of the reinforcing member 4 and provided at its free end with a hook 8' which is designed to hook under and engage the loop portion 9' of said member 4, both ends of this member being shown loop-shaped as shown in Fig. 4.

It will be obvious that should the wear band or loop 1 become worn it may be readily replaced, the reinforcing and connecting elements 4 lasting indefinitely and this leather band will have very little frictional engagement with the line which it supports, and will thus prolong the life of both.

The foregoing description and the drawings have reference to what may be considered the preferred or approved form of my invention. It is to be understood that I may make such changes in construction and arrangement and combination of parts, materials, dimensions, etc., as may prove expedient and fall within the scope of the claimed invention.

Having thus fully described my inven- tion, what I claim as new and desire to secure by Letters Patent, is:—

1. In a device of the class described, a leather band, a metal reinforce engaged with said band and composed of a piece of heavy wire folded midway its ends with the side members arranged parallel and spaced apart, the folded end forming a loop and the other end having an upwardly extending open loop with a hook at its free end for engagement with said loop, said ends being extended beyond the ends of said band.

2. In a device of the class described, an annular split leather band having laterally offset loops on its outer face near its opposite ends, a metal reinforce inserted in said loops and composed of a piece of heavy wire folded midway its ends with the side members thereof arranged parallel and spaced apart, said ends being extended beyond the ends of said band, the folded end forming a loop and the other end having an outwardly extending open loop with a hook at its free end for engagement in said loop and a hook carried by one of them for engaging the other.

In testimony whereof I affix my signature in presence of two witnesses.

JOHN W. BURT.

Witnesses:
J. B. BLONDWORTH,
J. F. HARRIS.

Copies of this patent may be obtained for five cents each, by addressing the "Commissioner of Patents, Washington, D. C."